(12) United States Patent
Wachtler et al.

(10) Patent No.: US 6,504,685 B1
(45) Date of Patent: Jan. 7, 2003

(54) MICROELECTRICALMECHANICAL DEVICE IMMOBILIZATION AND SEALING

(75) Inventors: Kurt P. Wachtler, Richardson, TX (US); Peter J. Maimone, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 140 days.

(21) Appl. No.: 09/634,097

(22) Filed: Aug. 8, 2000

Related U.S. Application Data
(60) Provisional application No. 60/151,637, filed on Aug. 31, 1999.

(51) Int. Cl.[7] .................................................. G11B 5/56
(52) U.S. Cl. ..................................................... 360/294.3
(58) Field of Search ............................... 360/294–294.6, 360/234.6, 264.4, 264.5

(56) References Cited

U.S. PATENT DOCUMENTS
6,283,581 B1 * 9/2001 Silverbrook .................. 347/54

* cited by examiner

*Primary Examiner*—A. J. Heinz
(74) *Attorney, Agent, or Firm*—Bret J. Petersen; W. James Brady; Frederick J. Telecky, Jr.

(57) ABSTRACT

A microelectromechanical (MEM) device with an expanded PTFE material over the gap between movable structures to provide electrical connection across the gap and prevent particles from contaminating the gap. A microelectromechanical (MEM) device is also immobilized by placing an expanded PTFE material over the gap between movable structures. The expanded PTFE material can be made stiff during manufacture and then flexible after the manufacturing process is complete. An embodiment of the invention is a MEM device configured as a micro-actuator for a dual-actuator hard disk drive.

16 Claims, 2 Drawing Sheets

MICROELECTRICALMECHANICAL DEVICE IMMOBILIZATION AND SEALING

This application claims the benefit of U.S. provisional application Serial No. 60/151,637, filed Aug. 31, 1999.

FIELD OF THE INVENTION

This invention generally relates to microelectromechanical (MEM) devices. More particularly, it relates to immobilization during assembly and sealing during operation of a MEMS device to prevent damage and contamination during manufacture, particularly for use as a micro-actuator in a hard disk drive.

BACKGROUND OF THE INVENTION

Microelectromechanical systems are integrated micro devices or systems combining electrical and mechanical components fabricated in the similar processes to those used in the fabrication of standard integrated circuit devices.

However, unlike standard integrated circuits which process electronic signals, microelectromechanical systems are designed to generate electronic signals by their ability to undergo physical deformation or motion in response to external physical stimuli such as acceleration, external atmospheric pressure or temperature, and acoustic waves.

Other microelectromechanical systems are now being introduced that provide mechanical movement in response to electrical stimulation. In particular, Microelectromechanical systems have been introduced to provide a micro-actuator for hard disk drive systems.

SUMMARY OF THE INVENTION

Due to their small size MEM structures may be fragile subsequent to manufacture and need protection during processing and system integration. The present invention describes a method and structure for protecting a MEM device during the manufacturing process and sealing the device against contamination during the use of the device.

In one embodiment of the invention, a MEM device is immobilized by placing a material over the gap between movable structures that can be made stiff during manufacture and then flexible after the manufacturing process is complete. A preferable material is expanded PTFE (ePTFE) that can be made stiff with a material that can later be dissolved and removed to leave a filter like cover over the gap in the MEM device.

An advantage of the present invention is immobilization material can be used as a filter or isolation membrane during the MEM devices actual operation mode to prevent contamination between the small gaps of the moving parts.

An additional advantage of the present invention is the expanded PTFE can be bonded to the MEM device by selective application of adhesive or by metallurgical attachment between metal on the MEM device and metal embedded in the ePTFE. This ability to vary the method of attaching the ePTFE enables the present invention to be adapted for use with expected variations of MEM devices for a variety of applications.

Another advantage of the present invention is the ePTFE material that bridges the gap between movable portions of the MEM device can be used to make electrical interconnects across the gap. Also, input and output connection points can be fabricated on the top surface, the bottom surface or through the web of the ePTFE material. These interconnects and connection points may be formed by a selective application of conductive material in both the X/Y as well as the Z-axis of the ePTFE material.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

The preferred embodiment of the present invention is best understood by referring to FIGS. 1–7 of the drawings, like numerals are used for like and corresponding parts of the various drawings.

Figure 1A:
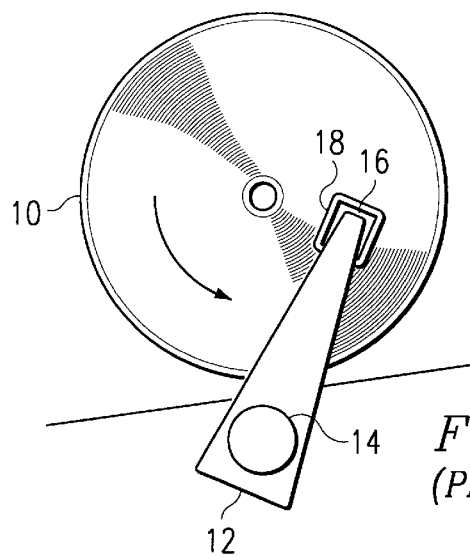
FIGS. 1a–1b A hard disk drive having a dual actuator according to the prior art.
Figure 1B:
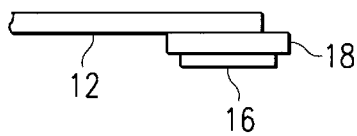

With reference to FIG. 1a, there is shown a simplified structure of an micro-actuator according to a co-assigned application Ser. No. 09/131,032, Dual Actuator Architecture for Hard Disk Drive Systems abandoned, incorporated herein by reference. As in the prior art, an actuator arm 12 rotates about a pivot point 14 to move a read/write head 16 in an arc over the rotating disk 10. In the dual-actuator design, the head 16 is placed on a micro-actuator 18 fixed to the end of the actuator arm 12. Thus, the term "dual-actuator" illustrates that there are two actuators: the conventional actuator which controls the position of the arm in the manner normally employed in HDD systems, and the micro-actuator which controls the eventual position of the read/write head as it is moved relative to the conventional arm. (For simplicity, the conventional actuator will be referred to as "actuator," and the additional actuator will be termed "micro-actuator".) FIG. 1b shows a side view of actuator arm 12 with the read/write head 16 attached to the micro-actuator 18.

Figure 2:
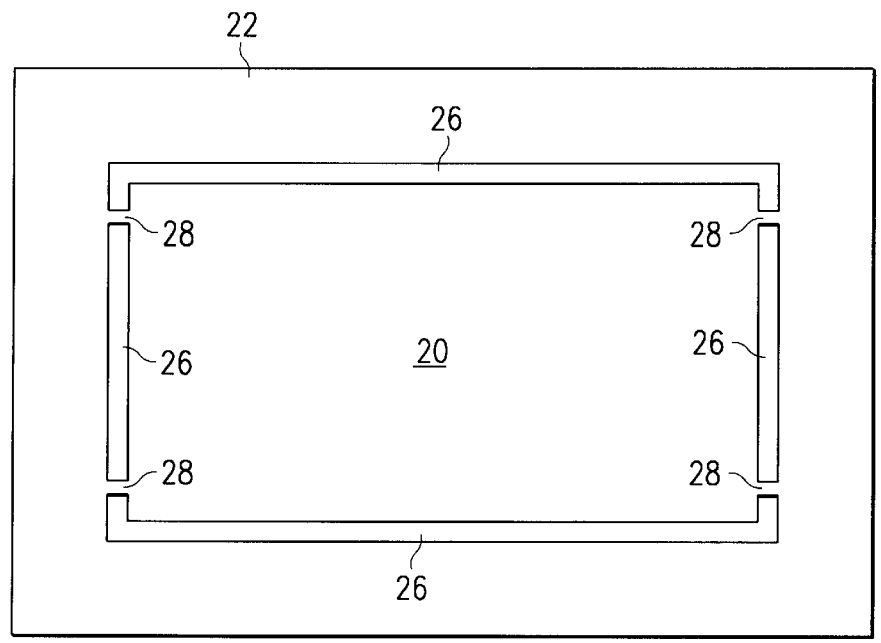
FIG. 2 A top view of a micro-actuator according to an embodiment of a previously filed invention.

FIG. 2 represents another representation of the micro-actuator discussed above. The micro-actuator 18 is preferably a very small silicon-based device fabricated using semiconductor IC processes. Such devices are sometimes called micro-electro-mechanical systems (MEMS). This micro-actuator for a hard disk drive uses silicon tethers as described in the previously filed application Ser. No. 09/343, 420 filed Jun. 30, 1999 now U.S. Pat. No. 6,356,418. A gap 26 separates the platform 20 and the motor frame 22. The head (not shown) for the disk would be located on the platform. In this arrangement, the platform 20 is secured to the motor frame 22 with solid tethers 28 rather than springs as used in some prior art structures. The solid tethers are preferably made of silicon, which are integrally formed upon fabricating the platform and motor frame from bulk silicon. In the illustrated arrangement, there are two tethers on each of two opposing sides of the platform. The two tethers on a side may be located near the non-tethered sides of the platform. The platform moves side to side within the motor frame as described above and perpendicular to the tethers.

Using a micro-actuator the HDD read/write head may be moved over one or more tracks (especially for high tracks per inch (TPI) systems) without using the main (conventional) actuator. In this mode of operation, the conventional actuator is essentially dormant, and the disturbances excited by bearing friction, micro-actuator device precisely controls the position of the read/write head, in the localized area at the end of the conventional actuator arm, and the position of the head can therefore be more accurately controlled. This of course enables much higher TPI performance. When appropriate electrical drive signals are applied to a drive motor (shown in FIG. 4 as described below), the tethers stretch or compress, and precision controlled deflection of the platform results. The HDD's read/write head will be attached to the movable platform, and the micro-actuator support assembly is then attached to the end of the actuator arm as described above. The micro-actuator thereby enables precise controlled movement of the head relative to the actuator arm.

Figure 3:
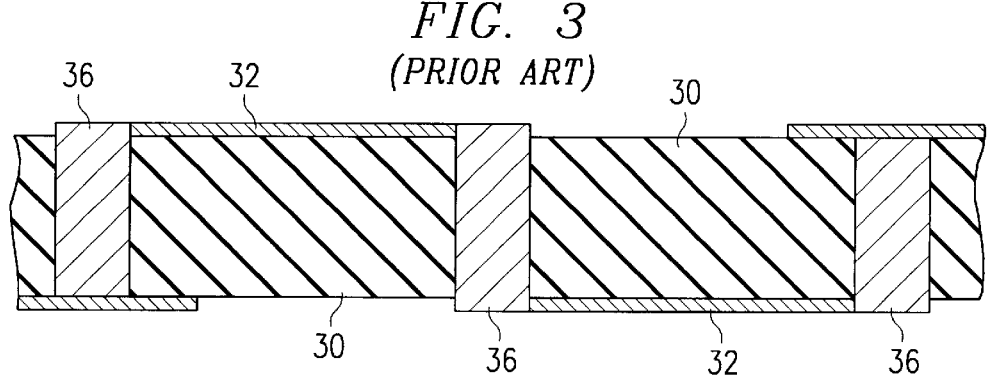
FIG. 3 A cross-sectional view of ePTFE material with horizontal and x/y plane conductors.

FIG. 3 illustrates a material used in an embodiment of the present invention having an Expanded PTFE material (ePTFE). Given its name by its similarity to expanded metal (where a sheet of metal is perforated with a pattern of cuts and then stretched or expanded), expanded PTFE is a proprietary material developed by W. L. Gore & Associates, Inc. (Gore). In the present invention this porous PTFE material is used to advantageously secure and seal a MEM device such as the illustrated disk drive micro-actuator. ePTFE can be impregnated with conductive metals to form conductive paths through the material and also make connections to adjacent materials. Through the use of a proprietary process, Gore selectively deposits metal through the web of the ePTFE 30, forming an electrically conductive, Z-axis contactor 36 from the top to the bottom of the material. Another proprietary Gore process allows a metal circuit 32 to be selectively deposited on either, or both, the top and bottom surfaces of the ePTFE. This deposited metal 32 may serve as X/Y plane electrical conductive circuits from point to point within the ePTFE material or termination pads for connection points for carry input or output signals external to the ePTFE material. Some embodiments of the present invention use materials produced by these proprietary processes to achieve one or more of the advantages described herein.

Figure 4:
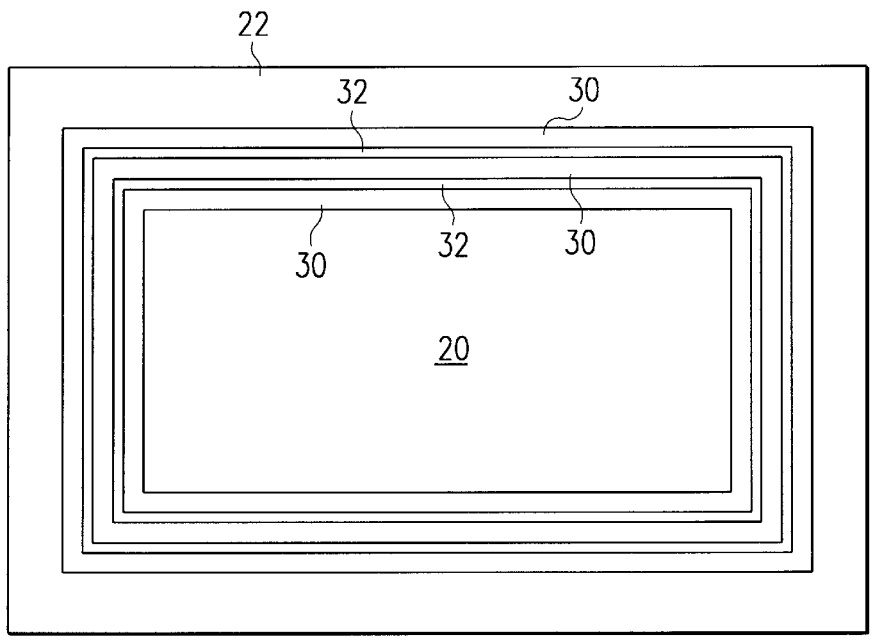
FIG. 4 A platform with a ePTFE filter according to an embodiment of the present invention.

FIG. 4 illustrates an embodiment of the present invention having an expanded PTFE material (ePTFE) over the moving part of the micro-actuator MEM device. The ePTFE material is preferably in a sheet form for this application. FIG. 4 further illustrates the motor frame of FIG. 3 with an ePTFE material 30 sealing the gap between the motor frame 22 and the platform 20. The ePTFE material 30 in this embodiment is a rectangular shaped layer of material. The center of the rectangular shaped layer of material may be cut out of the center as shown. The ePTFE piece 30 bridges over the gap 26 shown in FIG. 3. In the illustrated embodiment, the ePTFE piece is secured to either side of the gap, to the motor frame and the platform, with metal conductor traces 32 in the ePTFE material.

The metal traces on the ePTFE are preferably secured to the motor and platform with metallurgical bonding. The preferable way to perform the metallurgical bonding is a low temperature metal reflow process, for example: the use of standard tin/lead solder reflowed in a manner similar to conventional electronic component assembly methods. Another embodiment may use an electrically conductive polymer/metal as the bonding agent to connect the metal traces to the motor frame.

In a further embodiment, a polymer bond may be used where electrical conductivity is not required but immobilization of the MEM device and/or filtering of the gap is needed. In this embodiment, an adhesive may be selectively deposited in the area shown as metal traces 32 in FIG. 4 and the ePTFE material secured with this adhesive. In any case, minimizing temperature exposure during the securing process is desired to avoid inducing stresses in the ePTFE material.

An advantage of the present invention is to also use the ePTFE to temporarily immobilize the MEM device during final processing, handling and system assembly to protect it from damage. The porous ePTFE material that bridges the gap of the MEM device may be impregnated with a soluble material such as conventional photoresist or a soluble polymer to make it sufficiently stiff to provide the needed protection. Later the soluble material is dissolved with a proper solvent, which may be as simple as water or alcohol, or other solvent depending on the material used. The soluble material can be applied by spraying, screen-printing, spin coating or other common methods. Alternatively, the porous ePTFE could be stiffened with a material that can be sublimated when exposed to a particular pressure or removed with a plasma.

Figure 5A:
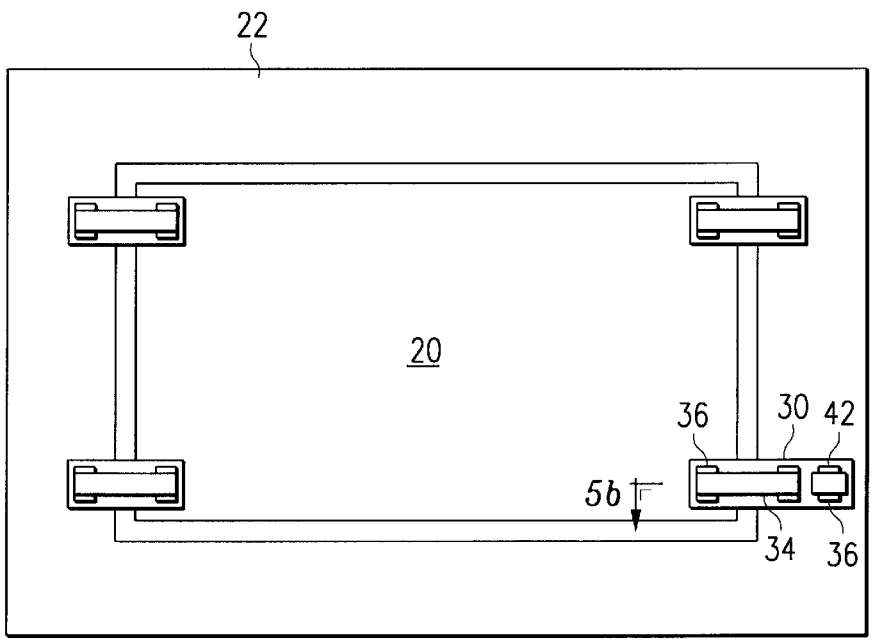
FIGS. 5a,b A platform with an ePTFE bridge having an electrical connection according to an embodiment of the present invention.

FIG. 5a illustrates another embodiment of the present invention. In this embodiment, the ePTFE is used to make an electrical connection across the gap between the motor frame 22 and the platform 20. A strip of ePTFE 32 bridges over the gap. In this preferred embodiment, the strip is also over the tether 28 (not visible). A portion 36 of the ePTFE is made conductive across the gap. Z-axis conductors 36 are made through the ePTFE at both ends of the strip which electrically connect to bonding sites on motor frame and platform and to the conductive portion of the strip of ePTFE.

Figure 5B:
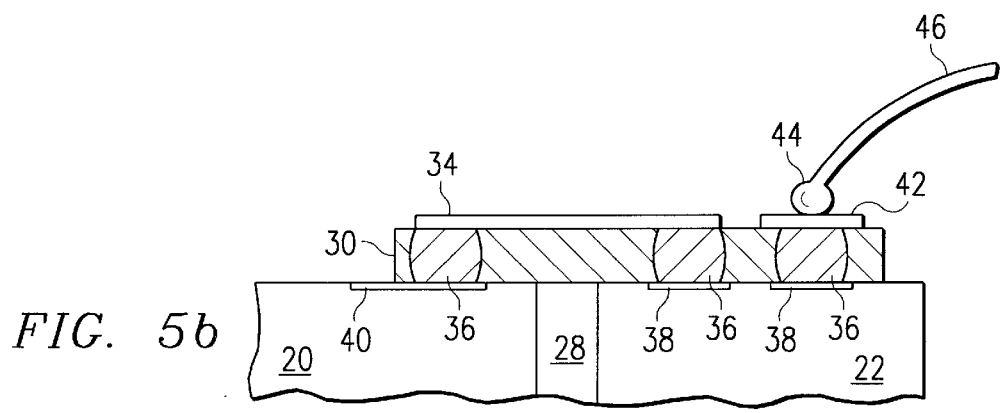

FIG. 5b shows a cutaway side view of the embodiment of FIG. 5a. The tether 28 is shown connecting the motor frame 22 to the platform 20 with the hidden lines indicating the gap beyond the cut line of FIG. 5a. On the surface of the MEM device is the strip of ePTFE 32 having a conductive circuit 34 that can be on the top surface of the strip. Embedded within the strip 32 are Z-axis conductors 36 that connect the conductive circuit 34 to bonding sites 38, 40.

Also illustrated in FIG. 5b is a bonding pad 42 formed on the surface of the ePTFE material 32. A wire bond 44 is made to the bond pad 42 to make a connection between a contact wire 46 and a circuit on the MEM device. The bond pad 42 may be connected to a MEM circuit using a Z-axis conductor 36 as shown, and may also make a connection on the MEM device to a bonding site 38. This bonding pad connection could be used in combination with the conductive circuit described in the previous paragraph to make electrical connections to circuits on the movable portion of the MEM device. This embodiment provides the advantage of making the bond connection to the more robust portion of the MEM device and then making electrical contact to the movable portion. A further advantage is the electrical connection of contact wire 46 can be made directly to the circuits on or within the ePTFE material.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments. For example, the illustrated embodiments are limited to translational movement micro-actuators, but the sensors of the present invention can be used for rotational or other types of micro-actuators. Further, the invention could be used for other MEM systems, particularly those that need positional accuracy such as optical data storage systems.

What is claimed is:

1. A microelectromechanical device comprising:
   a movable portion that moves with respect to a stationary portion;
   a gap separating the movable portion and the stationary portion; and
   a porous and flexible material attached to the movable portion and the stationary portion wherein the porous flexible material is expanded PTFE.

2. The device according to claim 1, wherein the expanded PTFE is bonded with a polymer adhesive to the moveable and stationary portions to secure the expanded PTFE material.

3. The device according to claim 1, wherein the expanded PTFE substantially covers the gap to provide a filter against materials entering the gap.

4. The device according to claim 1, wherein the expanded PTFE is embedded with metal that is metallurgically bonded to the moveable and stationary portions to secure the expanded PTFE material.

5. The device according to claim 4, wherein the embedded metal in the expanded PTFE material further comprises a conductive interconnect between contact pads on the stationary portion and contact pads on the moveable portion.

6. The device according to claim 5, further comprising a metal contact bonding pad formed on the surface of the expanded PTFE material over the stationary portion.

7. The device according to claim 1, wherein the expanded PTFE is embedded with metal forming a conductive circuit and at least one contact pad on the stationary portion.

8. The device according to claim 1, wherein the expanded PTFE is bonded with a polymer adhesive to the moveable and stationary portions to secure the expanded PTFE material.

9. A hard disk drive comprising a micro-actuator MEM device attached to an actuator to position a head over a rotating disk, the micro-actuator comprising:
   a movable portion that moves with respect to a stationary portion;
   a gap separating the movable portion and the stationary portion; and
   a porous flexible material attached to the movable portion and the stationary portion, and wherein the porous flexible material is expanded PTFE.

10. The hard disk drive according to claim 1, wherein the expanded PTFE is embedded with metal forming a conductive circuit and at least one contact pad on the stationary portion.

11. The hard disk drive according to claim 10, wherein the embedded metal in the expanded PTFE material further comprises a conductive interconnect between contact pads on the stationary portion and contact pads on the moveable portion.

12. The hard disk drive according to claim 10, wherein the expanded PTFE substantially covers the gap to provide a filter against materials entering the gap.

13. The hard disk drive according to claim 10, wherein the expanded PTFE is embedded with metal that is metallurgical bonded to the moveable and stationary portions to secure the expanded PTFE material.

14. The hard disk drive according to claim 13, wherein the embedded metal in the expanded PTFE material further comprises a conductive interconnect between contact pads on the stationary portion and contact pads on the moveable portion.

15. The hard disk drive according to claim 14, further comprising a metal contact bonding pad formed on the surface of the expanded PTFE material over the stationary portion.

16. The device according to claim 10, wherein the expanded PTFE is bonded with a polymer adhesive to the moveable and stationary portions to secure the expanded PTFE material.

* * * * *